(12) United States Patent
Reichow

(10) Patent No.: US 10,322,687 B2
(45) Date of Patent: Jun. 18, 2019

(54) STABILIZATION CIRCUIT FOR A VEHICLE ELECTRICAL SYSTEM

(71) Applicant: Continental Automotive GmbH, Hannover (DE)

(72) Inventor: Dirk Reichow, Wenzenbach (DE)

(73) Assignee: CONTINENTAL AUTOMOTIVE GMBH, Hanover (DE)

( * ) Notice: Subject to any disclaimer, the term of this patent is extended or adjusted under 35 U.S.C. 154(b) by 0 days.

(21) Appl. No.: 15/307,929

(22) PCT Filed: Apr. 23, 2015

(86) PCT No.: PCT/EP2015/058808
§ 371 (c)(1),
(2) Date: Oct. 31, 2016

(87) PCT Pub. No.: WO2015/165797
PCT Pub. Date: Nov. 5, 2015

(65) Prior Publication Data
US 2017/0120849 A1 May 4, 2017

(30) Foreign Application Priority Data

Apr. 30, 2014 (DE) ........................ 10 2014 208 257

(51) Int. Cl.
*H02J 3/14* (2006.01)
*B60L 1/00* (2006.01)
(Continued)

(52) U.S. Cl.
CPC .............. *B60R 16/03* (2013.01); *B60L 50/13* (2019.02); *B60L 53/14* (2019.02); *H02J 3/14* (2013.01);
(Continued)

(58) Field of Classification Search
CPC ............. B60R 16/03; H02M 3/04; B60L 1/00
See application file for complete search history.

(56) References Cited

U.S. PATENT DOCUMENTS 4,636,709 A * 1/1987 Ohsawa .............. H02M 3/1563
323/267
9,150,170 B2 10/2015 Pischke et al.
(Continued)

FOREIGN PATENT DOCUMENTS

DE 10258894 B3 1/2004 ................ H02J 7/14
DE 102007026164 A1 12/2008 ........... B60R 16/033
(Continued)

OTHER PUBLICATIONS

German Office Action, Application No. 102014208257.9, 6 pages, dated Dec. 16, 2014.
(Continued)

*Primary Examiner* — Rexford N Barnie
*Assistant Examiner* — Terrence R Willoughby
(74) *Attorney, Agent, or Firm* — Slayden Grubert Beard PLLC

(57) ABSTRACT

The present disclosure relates to electrical systems in general and embodiments of the teachings may include stabilization circuits for a vehicle electrical system comprising: a first connection for a first electrical system branch; a second connection for a pole of a first energy store of the first electrical system branch; a third connection for a second electrical system branch; a fourth connection for a third electrical system branch; a grounding connection for connection of the stabilization circuit to ground; a second energy store; a third energy store; a serial disconnection switch element between the second connection and the grounding connection; and a decoupling switch element connecting the first connection to the fourth connection. The second energy store is connected between the grounding (Continued)

connection and the third connection. The third connection is connected via the third energy store and a first converter to the fourth connection.

13 Claims, 1 Drawing Sheet

(51) Int. Cl.
*B60R 16/03* (2006.01)
*B60L 53/14* (2019.01)
*B60L 50/13* (2019.01)

(52) U.S. Cl.
CPC ....... *B60L 2220/42* (2013.01); *B60Y 2400/47* (2013.01); *Y02T 10/646* (2013.01); *Y02T 10/70* (2013.01); *Y02T 10/7005* (2013.01); *Y02T 10/7072* (2013.01); *Y02T 10/7077* (2013.01); *Y02T 90/14* (2013.01)

(56) References Cited

U.S. PATENT DOCUMENTS

| | | | |
|---|---|---|---|
| 9,487,089 B2 | 11/2016 | Reichow et al. | 307/9.1 |
| 2002/0152981 A1* | 10/2002 | Goetze | H02J 7/0024 123/179.28 |
| 2002/0158513 A1 | 10/2002 | Amano et al. | 307/10.6 |
| 2012/0286569 A1* | 11/2012 | Pischke | B60R 16/03 307/10.1 |
| 2013/0300193 A1* | 11/2013 | Reichow | B60R 16/03 307/10.1 |
| 2013/0313898 A1* | 11/2013 | Proebstle | H02J 7/1423 307/10.1 |
| 2013/0329476 A1* | 12/2013 | Spitz | H01L 29/861 363/127 |
| 2014/0070608 A1* | 3/2014 | Achhammer | H02J 1/08 307/10.1 |
| 2014/0354040 A1 | 12/2014 | Reichow et al. | 307/9.1 |

FOREIGN PATENT DOCUMENTS

| | | | | |
|---|---|---|---|---|
| DE | 102010063598 | * | 12/2010 | |
| DE | 102009028147 | A1 | 2/2011 | B06R 16/03 |
| DE | 102010027863 | A1 | 12/2011 | B06R 16/03 |
| EP | 2079148 | A2 | 7/2009 | B60L 11/14 |
| JP | 2007237856 | A | 9/2007 | B60R 16/03 |
| WO | 2011/121053 | A1 | 10/2011 | B06R 16/03 |
| WO | 2013/075975 | A1 | 5/2013 | B60R 16/03 |
| WO | 2014/033385 | A1 | 3/2014 | B06R 16/033 |
| WO | 2015/165797 | A1 | 11/2015 | B60R 16/03 |

OTHER PUBLICATIONS

International Search Report and Written Opinion, Application No. PCT/EP2015/058808, 17 pages, dated Jul. 8, 2015.

* cited by examiner

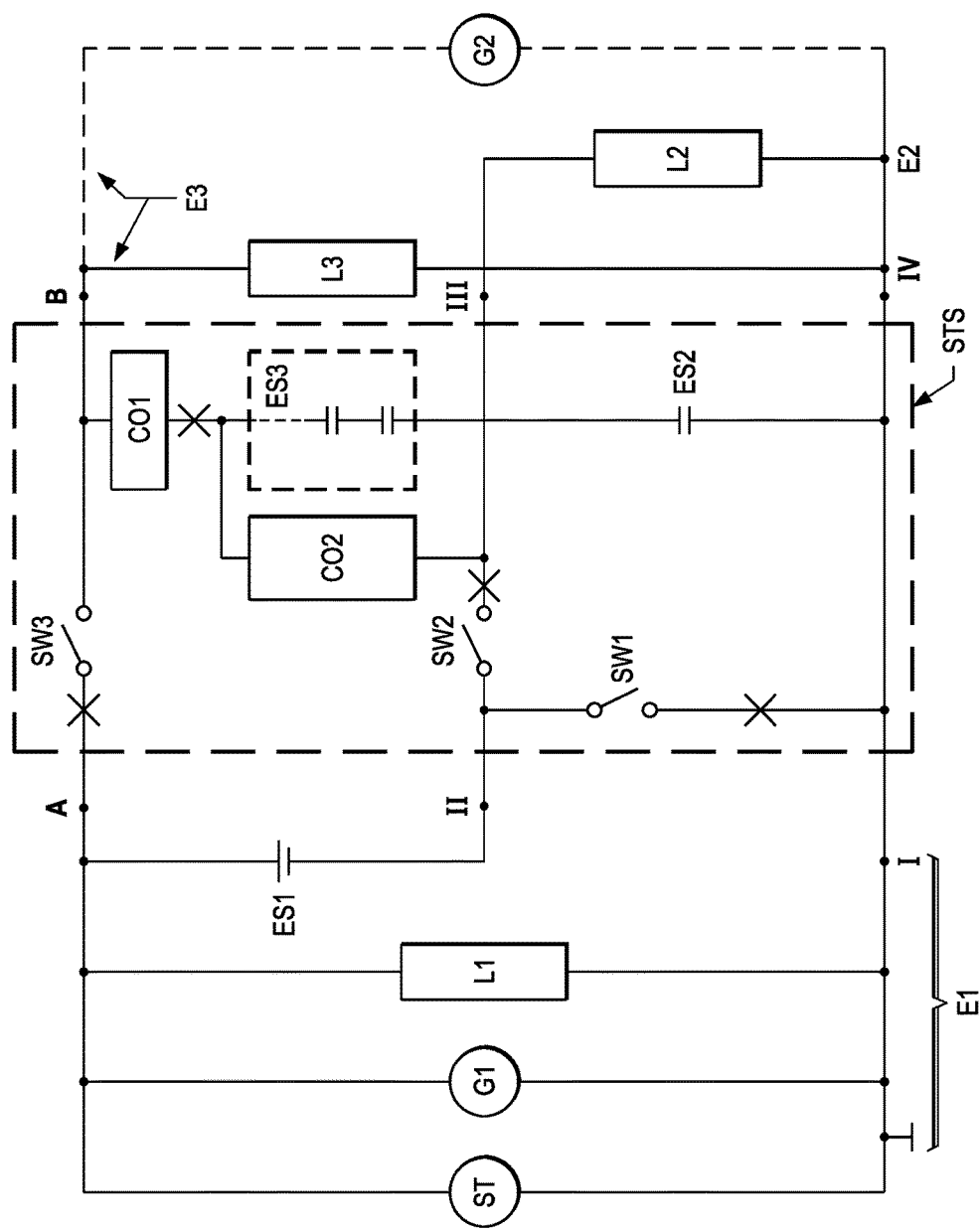

STABILIZATION CIRCUIT FOR A VEHICLE ELECTRICAL SYSTEM

CROSS-REFERENCE TO RELATED APPLICATIONS

This application is a U.S. National Stage Application of International Application No. PCT/EP2015/058808 filed Apr. 23, 2015, which designates the United States of America, and claims priority to DE Application No. 10 2014 208 257.9 filed Apr. 30, 2014, the contents of which are hereby incorporated by reference in their entirety.

TECHNICAL FIELD

The present disclosure relates to electrical systems in general and embodiments of the teachings may include stabilization circuits for a vehicle electrical system.

BACKGROUND

Electrical components in motor vehicles are supplied with power by means of a vehicle electrical system. In these vehicle electrical systems, voltage sources have a finite internal conductance so that under severe loading, i.e., at high supply currents, the voltage of the vehicle electrical system drops. This is designated as voltage dip and occurs, in particular, during starting processes of internal combustion engines of the vehicle or also during activation of other components which require a high current.

In numerous components, or consumers, such a voltage dip can result in a disturbance or reduction in function, which may persist over the time duration of the voltage dip. In numerous applications it is not sufficient and also costly, to provide a large voltage source, usually a battery, to overcome such a dip.

SUMMARY

Teachings of the present disclosure may be employed to provide means by which voltage dips at consumers can at least be reduced. For example, embodiments of these teachings may include a stabilization circuit (STS) for a vehicle electrical system, wherein the stabilization circuit comprises: a first connection (A) adapted for connection to a first electrical system branch (E1); a second connection (II) adapted for connection to a pole of a first energy store (ES1) of the first electrical system branch; a third connection (III) adapted for connection to a second electrical system branch (E2); a fourth connection (B) adapted for connection to a third electrical system branch (E3); and a grounding connection (I; IV) adapted for connection of the stabilization circuit to ground, a second energy store (ES2) and a third energy store (ES3); wherein the stabilization circuit (STS) further comprises a serial disconnection switch element (SW1) between the second connection (II) and the grounding connection (I) as well as a decoupling switch element (SW3), which connects the first connection (A) to the fourth connection (B); and wherein the second energy store (ES2) is connected between the grounding connection (I; IV) and the third connection (III) and the third connection (III) is connected via the third energy store (ES3) and a first converter (CO1) to the fourth connection (B).

Some embodiments may include a supporting switch element (SW2), which connects the second connection (II) to the third connection (III).

Some embodiments may include a second converter (CO2), which connects the third connection (III) to the third energy store (ES3), in particular to a pole of the third energy store (ES3), which points toward the fourth connection (B) or toward the first converter (CO1).

In some embodiments, the serial disconnection switch element (SW1) comprises a diode, whose direction of conduction points toward the first energy store and the supporting switch element (SW2) comprises a diode, whose direction of conduction points toward the second or toward the third energy store (ES2, ES3).

In some embodiments, the third energy store (ES3) comprises a single storage element or a series circuit of storage elements, in particular a series circuit of capacitors, in particular supercapacitors, double-layer capacitors, or electrolyte capacitors, or a series circuit of galvanic cells, in particular of lithium-based galvanic cells.

In some embodiments, the second energy store (ES2) comprises a single storage element or a series circuit of storage elements, which is or are connected between the grounding connection (I; IV) and the third connection (III), wherein the storage element of the second energy store is designed as a capacitor, in particular as a supercapacitor, double-layer capacitor, or electrolyte capacitor, or is configured as a galvanic cell, in particular as a lithium-based galvanic cell. The second energy store can also consist of two or three individual storage elements which can be connected parallel to one another.

In some embodiments, the storage elements of the second and/or third energy store (ES2, ES3) each comprise an individual capacitor or a parallel circuit of a plurality of capacitors, wherein in particular the second and/or the third energy store comprises a plurality of series circuits of parallel-connected capacitors.

In some embodiments, the switch elements are configured as power semiconductor switches, in particular as MOSFETs or as electromechanical switches, in particular as relays.

Some embodiments may include a drive circuit, which is connected to at least one of the switch elements (SW1, SW2, SW3) and/or at least one of the converters (CO1, CO2) in a driving manner, wherein the drive circuit is adapted to set the elements connected thereto into at least one of the following states: a regeneration state in which the serial disconnection switch element (SW1) is open and the decoupling switch element (SW3) is closed in order to transmit regenerative power, which is present at the first connection (A) or at the fourth connection (B), to the second and the third energy stores (ES2, ES3), in particular via the first converter (CO1); a first start state in which the decoupling switch element (SW3) is open and the serial disconnection switch element (SW1) is closed in order to transmit power from the first energy store ES1 to the first connection (A) in order to supply the first electrical system branch (E1), which can be connected thereto, without adversely affecting the other electrical system branches (E2, E3) during a start process; or a second start state in which the decoupling switch element (SW3) is closed and the serial disconnection switch element (SW1) is open or closed in order to transmit power from the second and/or third energy store (ES2, ES3) to the first connection (A) to support a start process.

BRIEF DESCRIPTION OF THE DRAWINGS

FIG. 1 shows an overview circuit diagram illustrating the mode of operation of embodiments of the teachings of the present disclosure.

DETAILED DESCRIPTION

In some embodiments, a stabilization circuit comprises, in addition to a connection for a first (primary) energy store, possibly a lead battery or a lithium battery, a second energy store, and a third energy store. The second energy store can be connected by means of a serial disconnection switch element of the stabilization circuit in series with the first energy store in order to provide the resulting added voltage (of the first and second energy store) for a consumer, which requires a high current (possibly a starter). The third energy store serves, together with a first converter of the stabilization circuit, as an additional (temporary) energy source, whose output power can be added to the power or the powers of the other energy sources if required.

Furthermore, the third energy store enables the short-term intake of energy, in particular in the form of regenerative power. Regenerative power is designated as electrical power, which is generated by conversion of kinetic energy of the vehicle by means of a generator. In this case, the third energy store is operated with a preferably higher (total) nominal voltage than the first, so that electrical power at high voltages which occur during regenerative operation can readily be taken in in order to increase the voltage at the second and/or third energy store. Furthermore, the nominal voltage of the third energy store can be lower than the nominal voltage of the first energy store or can correspond to this. The third energy store operates at a higher nominal voltage and can therefore also store a larger quantity of energy with lower capacity. The third energy store is connected via a first converter to the remaining stabilization circuit, so that strongly varying voltages (as a result of varying charge state) of the third energy store can be adapted by the converter.

Here, a converter designates a component which converts an electrical power of one voltage or current level into a different voltage or current level. Voltage converters may be used as converters, in particular synchronous converters, wherein step-up converters, step-down converters, or a combination thereof can be used. In some embodiments, bidirectional converters are used as converters. Bidirectional converters have (at least) one first and one second connections, between which by means of the converter electrical power is transmitted, wherein the flow direction of the power can point from the first connection to the second connection and conversely. The converter is a four pole with two supply voltage connections, a primary circuit and a secondary circuit. The primary connection or the secondary connection can be connected to one of the supply voltage connections. The supply voltage connections may include a grounding connection and a supply potential connection. The converter can deliver power from the primary connection to the secondary connection and in some embodiments also operate in the reverse direction.

The stabilization circuit is adapted to be connected within a vehicle electrical system to a first, second, and third electrical system branch. Furthermore there are connections for connection of the first energy store (which can be assigned to the first electrical system branch) and the ground to the stabilization circuit.

In some embodiments, the stabilization circuit comprises a first connection (A) adapted for connection to a first electrical system branch (E1). Located in this electrical system branch is a starter and a generator or a starter generator or in general an electric machine, e.g., an electric motor, which serves for traction of the vehicle and/or provides electrical energy for the vehicle electrical system. Furthermore, at least one consumer is located in this electrical system branch. This can be protected from voltage dips whereby when high currents are required, the second and/or third energy store directly or indirectly (via a converter) assists the first energy store. Further, consumers can be provided in other electrical system branches, which are either protected in this way or by decoupling from the first energy store or from the first electrical system branch before voltage dips. The first energy store is assigned to the first electrical system branch but not firmly connected to this. On the contrary, the first energy store is connected via the serial disconnection switch element to ground and thus also to the first electrical system branch, which has the same ground potential.

To this end, the stabilization circuit may comprise a second connection, which is provided for connection to a pole of the first energy store (the negative pole). The serial disconnection switch element within the stabilization circuit switchably connects the second connection to a grounding connection of the stabilization circuit or at least to a grounding connection, which is provided for connection of the ground of the first electrical system branch. Since its own input (or connection) is provided for the first energy store in the stabilization circuit, a further voltage source (the second and/or the third energy store, possibly via a converter) can be switched to the first energy store by means of the stabilization circuit, possibly connected in series with the first energy store. As a result, the stabilization circuit adds the voltage of the first energy store to that of the further power source in order to provide the summed voltage at the first connection (and ground).

The stabilization circuit may include a third connection adapted for connection to a third electrical system branch. The third connection is used for connecting the second electrical system branch to the stabilization circuit, to the second or third energy store in the stabilization circuit. Furthermore, the third connection can serve for connection to the first electrical system branch, which is connected via the second connection. As a result, the second electrical system branch can be decoupled from the first electrical system branch in a controlled manner. Since the second energy store (within the stabilization circuit) is connected to the third connection and thus can be connected directly to the second electrical system branch, it is possible to see the second energy store as part of the second electrical system branch, so that a part of the second electrical system branch is provided inside and a part of the second electrical system branch is provided outside the stabilization circuit. In an alternative configuration, instead of the second energy store, the stabilization circuit has a connection, which is fitted for connection to a second energy store. Instead, the third connection can also be provided to be connected to the second energy store, which is located outside the stabilization circuit and inside the second electrical system branch which can be connected thereto.

The stabilization circuit has a fourth connection. This is adapted for connection to a third electrical system branch. Since in the stabilization circuit the fourth connection is connected to the first connection via a controllable decoupling switch element, the fourth connection can thereby be decoupled from the first connection, possibly in order to protect the fourth connection (and the third electrical system branch which can be connected thereto) from voltage dips at the first connection or in the first electrical system branch or if a generator within the third electrical system branch feeds power into the fourth connection. Via the fourth connection, regenerative power can thus be supplied to the stabilization circuit, which is possibly produced by an (optional) generator or a starter generator within the third electrical system branch. The fourth connection is therefore used to take in regenerative power, in particular in order to guide this to the third energy store or to the second and third energy store for buffer storage.

The various embodiments described here for decoupling the electrical system branches among one another or of the first, third, and fourth connections further serve to reduce voltage dips, since additional loads (at the third and fourth connection) are at least temporarily separated from the first connection and therefore from the first electrical system branch at least temporarily (e.g., during the loading in the first electrical system branch or of the first energy store). Furthermore, with the possibility of decoupling, the regenerative power is thus better controlled.

The stabilization circuit may include at least one grounding connection. This is adapted for connection of the stabilization circuit to a ground potential. Here the grounding connection can be adapted to be connected to the ground of the first, second, or third vehicle electrical system. Two or more grounding connections can be provided, which may be (directly) connected to one another within the stabilization circuit. Thus, a first grounding connection can be provided for connection to the first electrical system branch (e.g., to its ground potential) as well as a second grounding connection, which is configured for connection to the second or the third electrical system branch or for joint connection to the second and third electrical system branch (e.g., to its ground potential). The last-mentioned variant is shown as an example in the FIGURE.

As already noted, the stabilization circuit comprises a second energy store and a third energy store. At least one of these two energy stores can be separated so that the stabilization circuit has an energy store connection, which is provided for connection to the second energy store or third energy store, wherein two energy store connections are provided to connect the second and the third energy store to the stabilization circuit. The second or the third energy store can in this case be connected between the third connection and the relevant energy store connection.

The stabilization circuit may include a serial disconnection switch element between the second connection and the grounding connection. This enables the separation between the second connection, in particular the minus pole of the first energy store connected thereto, and ground in order to raise the second connection to a higher potential (with respect to ground) by serial insertion. As a result, under high current loading the total voltage (between plus pole of the battery or the first connection) and ground can be increased. The stabilization circuit has a decoupling switch element, which connects the first connection to the fourth connection (switchable). The decoupling switch element is possibly used for decoupling the first electrical system branch (in particular the first energy store or the consumer in the first electrical system branch, inter alia the starter) from at least one further electrical system branch. Furthermore the third electrical system branch or the fourth connection can be decoupled from the first connection by the decoupling switch element.

Furthermore, the second energy store is connected between the grounding connection and the third connection. This energy store can be used for raising the potential level of the first energy store and/or can be used for supplying the third connection (or the consumer connected thereto).

The third connection is connected via the third energy store and a first converter to the fourth connection. The second and third energy stores may be connected in series via a permanent connection. There may be a connection point between the second and the third energy stores, in particular between the plus pole of the second energy store with the minus pole of the third energy store. This is connected to the fourth connection or forms the fourth connection.

In some embodiments the connection point occupies the position of the fourth connection, wherein the connection point in particular forms no connection (to the outside). The second converter (see further description) can be further connected to the connection point, in particular to a second connection of the converter, wherein a first connection of the second converter can be connected to the first converter (or also to the fourth connection). In addition, a supporting switch element can be connected to this connection point, which connects the connection point to the second connection or to the serial disconnection switch element.

In some embodiments the stabilization circuit can have a supporting switch element, possibly as mentioned hereinbefore. This switchably connects the second connection to the third connection. The supporting switch element may switchably connect the second connection, which is configured for connection to the first energy store, to the second and/or third energy store. In this case, the supporting switch element can connect the second connection to a plus pole of the second energy store and/or to a minus pole of the third energy store. In addition, the supporting switch element can connect the second connection to a (directed to ground) connection of the second converter. This connection of the second converter may be connected to a connection point, via which the second energy store (or its plus pole) are connected to the third energy store (or its minus pole) among one another. The (directed to ground) connection of the second converter may be connected to the second energy store (or its plus pole) and/or to the third energy store (or its minus pole).

As already mentioned, the stabilization circuit can further comprise a second converter. This connects the third connection (or the plus pole of the second energy store) to the third energy store, in some cases at its plus pole. The second converter is thus connected parallel to the third energy store. The second converter connects the third connection (or the plus pole of the second energy store or the minus pole of the third energy store or its link point) in particular to a pole of the third energy store, which points toward the fourth connection or toward the first converter.

The second converter may have, for example, a nominal power or a nominal current, which is no more than 30%, 20%, 10%, 5%, 1%, 0.4% or 0.2% of the nominal power or the nominal current of the first converter. The second converter is therefore designed for significantly lower powers or currents than the first converter. In some embodiments, the second converter is adapted to charge the second energy store and to discharge independently of the first energy store, in particular with constant current. The first converter is configured to charge the second and the third energy store and to discharge independently of the first energy store, with constant current. Furthermore, the first converter can also regulate the voltage of the first and/or third electrical system branch when the generator or the generators deliver no power or reduced power or the switch SW3 is open.

The third energy store can have a lower overall capacity than the second energy store. Here the overall capacity is the charge within the energy store relative to the applied voltage.

The third energy store can, for example, have a capacity of no more than 70%, 50%, 40%, 30% or 10% of the capacity of the second energy store.

Alternatively, the capacity of the third energy store can correspond to that of the second energy store.

The third energy store may have a higher nominal voltage than the second energy store. This can be a nominal voltage, which is more than 50%, 100%, 200% or 300% higher than the nominal voltage of the second energy store. This can further apply to the (maximum) operating voltage. The third energy store can further have a nominal voltage, which is adapted to the voltage (the regenerative power) at the third connection. On the other hand, the second energy store can have a nominal voltage, which is suitable for supporting the first energy store during connection of the first to the second energy store. Thus, the nominal voltage of the third energy store can, for example, be 3 V, 5 V, 12 V, 24 V, or 48 V. The nominal voltage of the second energy store can, for example, be 2.5 V, 5 V, or 7.5 V. The nominal voltage of the first energy store can, for example, be 12 V to 14 V.

The third energy store may comprise a series circuit of storage elements. This can be a series circuit of capacitors, e.g., supercapacitors, double-layer capacitors, or electrolyte capacitors. Furthermore, this can be a series circuit of galvanic cells, e.g., of lithium-based or nickel-based galvanic cells. The first energy store can comprise a series circuit of galvanic cells, e.g., a series circuit of lead-based galvanic cells (in the sense of a lead battery) or a series circuit of lithium-based cells. In some embodiments, cells of a lithium ion rechargeable battery are designated as lithium-based cells. In some embodiments, cells of a lead rechargeable battery are designated as lead-based galvanic cells. The first, second, and/or third energy stores can comprise electrochemical or electrostatic storage elements. Alternatively, the third energy store comprises only one storage element.

The second energy store can comprise a single storage element or a series circuit of storage elements, which is connected between the grounding connection on the one hand and the third connection (or the supporting switch element or the third energy store) on the other hand. In specific configurations the second energy store can comprise a series circuit of storage elements. The storage element of the second energy store is designed as a capacitor, e.g., a supercapacitor, double-layer capacitor, or electrolyte capacitor, or is configured as a galvanic cell, in particular as a lithium-based galvanic cell.

The third energy store can, for example, comprise a series circuit of 1-20 storage elements. The second energy store can, for example, comprise a series circuit of 1-3 storage elements. A storage element here corresponds to a capacitor (e.g., supercap capacitor or double-layer capacitor). The third energy store can, for example, have nominal voltages of 4-16 Volts or even 12-48 Volts, corresponding to a series circuit of storage elements having a respective nominal voltage of about 1.5-5 Volts. The second energy store can have a nominal voltage of 1.5-5 Volts, possibly only if a storage element in the form of a capacitor is present.

The storage elements can each comprise an individual capacitor or a parallel circuit of a plurality of capacitors. Furthermore, the second and/or the third energy store can comprise a plurality of series circuits of capacitors connected in parallel. The storage elements can be electrochemical or electrostatic stores. In some embodiments, the second energy store can comprise a parallel circuit of at least two capacitors.

The switch elements can be configured as power semiconductor switches, e.g., MOSFETs (for example, n-MOSFETs) or IGBTs, or as electromechanical switches, in particular as relays or protection. The decoupling switch element may comprise an electromechanical switch, possibly as a relay. The switch elements or at least one of the switch elements can be configured as a series circuit of second anti-series-connected power semiconductor switches, if these comprise a substrate diode (inverse diode or body diode). If one switch element comprises two power semiconductor switches, these are connected in series in such a manner that the directions of conduction of the substrate diodes are opposite one another. The supporting switch element and/or the serial disconnection switch element may be configured with power semiconductors as switch elements.

The switch elements can each comprise a diode connected in parallel (to the connections of the switch element). These diodes can be components or as substrate diodes. The serial disconnection switch element can comprise a diode whose direction of conduction points to the first energy store. The supporting switch element can comprise a diode whose direction of conduction points to the second and/or to the third energy store. The diodes are in particular substrate diodes of an n-MOSFET, which is used as a switch element.

A drive circuit can further be provided, either inside the stabilization circuit or outside the stabilization circuit, wherein in this case a control interface is provided, which is adapted for connection to the drive circuit.

The drive circuit (or the control interface) is connected to at least one of the switch elements (SW1, SW2, SW3) and/or at least one of the converters (CO1, CO2) in a driving manner. In some embodiments, the drive circuit can be connected to all the switch elements mentioned here in a driving manner. The drive circuit may be connected to all the converters mentioned here or converters in a driving manner. The drive circuit can comprise circuit groups, which operate independently of one another. Thus, the converters can be controlled by different circuit groups, e.g., by circuit groups which are separate from circuit groups, which drive other components (possibly the switch elements). In particular, circuit groups operating independently of one another can be used to drive the switch elements, in particular a specific circuit group for each switch element.

The drive circuit is adapted to set the elements connected thereto (switch elements or converters) into specific switch states or operating states by delivering control signals. At least one of the following states is possible:

A first regenerative state, in which the serial disconnection switch element is open. Furthermore, in this state the decoupling switch element is closed. Thus, regenerative power, which is present at the first connection or at the fourth connection can be transmitted to the third energy store, in particular in order to charge this. Here the regenerative power is guided via the first converter. As a result, the regenerative power is transmitted to the second and/or third energy store.

When the serial disconnection switch element is open and the decoupling switch element is closed, the arrangement of the third with second energy store and first converter acts as a capacitive vehicle electrical system support with positive negative voltage regulation of the first (or second) generator. In the case of negative control voltage modulation of the first (or second) generator, the diode of the serial disconnection switch element in conjunction with the first energy store prevents or minimizes a drop in the vehicle electrical system voltage.

Positive and negative control voltage modulation of the generator is understood as the, for example, up-modulated sinusoidal profile of the control voltage to the target value of the vehicle electrical system. In this case, the target value of the control voltage of the vehicle electrical system is for example 13 V and the control voltage modulation amplitude is +/−1 V relative to the target value of the vehicle electrical system. The control voltage modulation is visible at the first or third electrical system branch when no sufficiently large first energy store or other capacitive-acting store are provided. In general, the control voltage modulation amplitude is to be understood as an alternating component of the current delivered by the generator or the voltage produced by this. The second and/or third energy store (in particular the series circuit of this energy store) is used here as a smoothing member for the generator power, which has an alternating current component or an alternating voltage component. A second regenerative state, in which the serial disconnection switch element is closed. Furthermore, in this state the decoupling switch element is open. In this case regenerative power can be taken in via the fourth connection.

A first start state, in which the decoupling switch element is open. The serial disconnection switch element is closed in this state. Power is delivered by the first energy store to the first connection. The first electrical system branch which can be connected thereto is thus supplied without adversely affecting the other electrical system branches during a starting process (in the first electrical system branch). The first converter can deliver power to the fourth connection in order to supply the load connected there. Alternatively, the serial disconnection switch element can be open in the first start state. The supporting switch element can be closed or can be open. The first converter can in this state deliver power from the second and/or from the third energy store to the second connection in order to support the first energy store.

A second start state, in which the decoupling switch element is closed. In this second start state, the serial disconnection switch element is open or alternatively, closed. In this state, power is transmitted from the second and/or from the third energy store (depending on the switching state of the serial disconnection switch element or the supporting switch element) to the first connection to support a start process. If in the second start state, the serial disconnection switch element is open, the supporting switch element is closed.

Furthermore, the switch elements can have a base state, wherein the drive circuit can also define this base state of the switch elements. The base state can be a state, which occurs during switching on or without power supply or without (further) control signals. The serial disconnection switch element can be closed in the base state. The supporting switch element can be open in the base state. The decoupling switch element can be closed in the base state. Alternatively the serial disconnection switch element can be open in the base state, in particular in order to require only a little current for driving in a sleep mode of the stabilization circuit.

The overview circuit diagram in FIG. 1 shows a vehicle electrical system with a first electrical system branch E1 and a second electrical system branch E2 and a third electrical system branch E3. The first electrical system branch E1 comprises a starter ST and a generator G1, wherein the starter is configured as a starter for an internal combustion engine and the generator G1 contributes to the power supply of the vehicle electrical system and can thus be configured as a light machine. Furthermore, consumers in the form of the load L1 are shown in the vehicle electrical system E1. A battery ES1 pertaining to the first electrical system branch, which is generally provided as an electrical energy store, is used for the power supply of the starter and the load L1. The battery ES1 is not directly connected to the first electrical system branch but is connected to the remaining electrical system branch E1 via the stabilization circuit described here.

To this end, the stabilization circuit has a first connection A and a second connection II, to which the connections of the battery can be connected. The first connection A corresponds to the positive potential of the electrical system branch E1 and the second connection II serves the stabilization circuit as connection for the minus pole of the energy store ES1. A grounding connection I corresponds to the ground of the first electrical system branch E1, exclusively the first energy store ES1. The second connection II can have the same potential as the grounding connection I. In order however to support the voltage in the first electrical system branch E1 exclusively of the battery ES1, the potentials of the second connection II and the grounding connection I can be different if a second energy store is connected in series between these.

In addition, the stabilization circuit STS comprises a serial disconnection switch element SW1 between the second connection II and the grounding connection I. If the serial disconnection switch element SW1 is closed, the potential of the second connection II corresponds to the ground potential of the grounding connection I. In order to support the load L1 (or the relevant consumers) and the starter ST, the serial disconnection switch element SW1 can be open, wherein the second energy store ES2 and/or the third energy store ES3 can be connected in order to support the battery ES1 via the first converter CO1. Here the supporting switch element SW2 is open.

To this end, the stabilization circuit comprises a second energy store ES2, which can be connected via a supporting switch element SW2, whereby the second energy store ES2 is connected in series with the first energy store (to the first connection A and the second connection II).

The stabilization circuit STS further comprises a decoupling switch element SW3, which connects the first connection A (the positive potential) of the first electrical system branch E1 to the second energy store ES2 and to the third energy store ES3. Here the decoupling switch element SW3 is connected between the first connection A and a first converter CO1, wherein the first converter CO1 on the side opposite the decoupling switch element is connected to the third energy store ES3 and via this inter alia to the second energy store ES2. A second converter CO2 connects the plus pole of the second energy store ES2 to the plus pole of the third energy store ES3. Here the second and the third energy store are connected in series, wherein the resulting link point is connected to one side of the second converter CO2, while the opposite side of the second converter CO2 is connected to the plus pole of the third energy store. In particular, the second converter CO2 connects the connection point which lies between the third and second energy store to the connection point, via which the first converter CO1 is connected to the third energy store ES3. The stabilization circuit of FIG. 1 has a third connection III, which corresponds to the connection point of the second and the third energy store ES2, ES3. Furthermore, the third connection III corresponds to the potential of the connection point of the supporting switch element SW2 and the second converter CO2 or the connection point between the second energy store ES2 and the second converter CO2.

Consumers (shown by a load L2) can be connected to this third connection III.

A third vehicle electrical system E3 with consumers (shown by load L3) is connected via the fourth connection B to the stabilization circuit STS. By means of the decoupling switch element SW3, the connection between the first connection A (connected to a first electrical system branch) and the fourth connection B (connected to the third electrical system branch E3) can be opened or closed in a controlled manner. The decoupling switch element SW3 is located between the first connection A and the converter CO1. This further enables via the first converter CO1, power for the fourth connection B, for the third vehicle electrical system connected thereto, to be provided from the second and/or third energy store. When the decoupling switch element SW3 is open, the energy of the second and/or third energy store ES2, ES3 is only transmitted to the fourth connection B. In this case, the fourth connection B is separate from the first connection A, so that the electrical system branch E1 connected to the first connection A and the third electrical system branch E3 can be operated independently of one another.

A generator G2, which in particular forms a part of the third vehicle electrical system E3, can further be connected to the fourth connection B. The generator G2 is in particular a starter generator or electrical machine. The generator G2 is adapted to produce recuperative power in order to transmit this via the fourth connection B and the grounding connection I to the stabilization circuit, in particular to the second or to the third energy store ES2, ES3. To this end, the grounding connection can be two-part, wherein the grounding connection I is assigned to the first vehicle electrical system E1 and a second grounding connection IV is connected to the third vehicle electrical system E3. The two grounding connections are connected to one another so that these can also be considered as a single grounding connection.

The energy stores ES2, ES3 are shown as integrated in the stabilization circuit in FIG. 1. Alternative embodiments provide that at least one of these energy stores is located outside the stabilization circuit, wherein respectively two connections occur at the location of the energy stores, via which the energy store can be connected.

The connections shown in FIG. 1 are equipped for power transmission, i.e. for supplying consumers or for transmitting regenerative power or regenerative energy. Signal circuits and signal lines are not shown in FIG. 1 for reasons of clarity, wherein the stabilization circuit of FIG. 1 can also comprise a drive circuit, which can be connected in a controlling manner to the switch elements SW1, SW2, or SW3 and/or to the converters CO1, CO2.

The stabilization circuit can furthermore comprise at least one current sensor, wherein the at least one current sensor can also be connected to the drive circuit, so that this drives the relevant components depending on the currents and/or depending on detected potentials. For detection of the potentials the drive circuit can also be connected to the connections A, B, I, II, and/or III and furthermore also to the link point between the third energy store ES3 and the first converter CO1.

At least one current sensor can be connected upstream of the first connection A within the stabilization circuit, i.e., between the decoupling switch element SW3 and the first connection A. The relevant point is identified in FIG. 1 as a cross (X). Another possible point for a current sensor is located between the grounding connection I and the serial disconnection switch element SW1. Another possible point for a current sensor is located directly upstream or downstream of the supporting switch element SW2. In particular such a current sensor can be provided between the supporting switch element SW2 and the connection point between the second and the third energy store ES2, ES3. Finally a current sensor can be provided on the first converter CO1, in particular between the converter CO1 and the fourth connection or the decoupling switch element SW3 or, as shown in FIG. 1, between the first converter and the third energy store ES3.

The connections A and B form supported positive potentials A and B, which can be supported by means of the stabilization circuit under load, or can be separated from one another by means of the stabilization circuit in order to avoid any mutual influence. Here the first influence A is supported by a connection of at least one further energy store (ES2 or ES2 with ES3) to the first energy store ES1. The fourth connection B is supported by the second or by the third energy store ES2, ES3, wherein the converter CO1 enables the potential of the second and/or third energy store ES2, ES3 to be adapted in such a manner that a preferably constant voltage is obtained at the connection B. As a result, for example, sensitive consumers can be connected as consumers of the third electrical system branch (characterized by load L3) since the switch element SW3 enables the electrical system branch E1 in which strong loadings take place, to be separated from the third electrical system branch E3.

Sensitive loads have a function adversely affected by a voltage dip in such a manner that critical situations can arise for the vehicle. Here the loads L1 or in particular L3 relate to safety-relevant consumers such as motor control, signal transmitters, safety measures such as airbag etc., ESP, ABS or other safety-relevant assistance functions. In particular, during a starting process which is executed by the starter ST, decoupling switch element SW3 can be open so that the third electrical system branch E3 is on the one hand not loaded and on the other hand, can be supplied by the second energy store ES2 or the second energy store ES2 together with the third energy store ES3 via the converter CO1. The second converter CO2 is used here not primarily for supporting the loads in the third electrical system branch or the connection B, but is used for balancing the second energy store with respect to the third energy store ES3. The function of charging by the second converter CO2 is time-critical to a certain extent so that the power of the second converter CO2 can be significantly below the power of the converter CO1, which has the function of voltage stabilization for the loads L3 in the third electrical system branch E3. The charging of the second energy store must take place within the time between starting processes or between high-current intervals in the first or third electrical system branch so that the time interval between starting processes (or high-current intervals) forms a limit for the time, in which the second energy store ES2 must be charged.

The second connection II is used for connection of the negative pole of the first energy store ES1 and when the serial disconnection switch element SW1 is closed corresponds to the grounding potential I, but can be open in the case of supporting connection of the second energy store ES2 and thus have a higher potential (corresponding to the voltage of the second energy store ES2) if the supporting switch element SW2 is closed. The third connection III enables direct access to the voltage of the second switch element ES2, so that additional loads L2 can be connected here. The loads L2 can be components for battery management, in particular for management of the second energy store, for example, sensors, measurement circuits, cell balancing, and monitoring circuits. In particular, via the connection B regenerative power can be passed to at least one of the energy stores, preferably to the second energy store ES2 and/or to the third energy store ES3. Here the regenerative power is guided via the first converter CO1.

REFERENCE LIST

A First connection
II Second connection
III Third connection
B Fourth connection
I Grounding connection
IV Additional grounding connection
E1 First electrical system branch
E2 Second electrical system branch
E3 Third electrical system branch
ST Starter (part of the first electrical system branch)
G1 Generator (part of the first electrical system branch)
L1 Consumer (part of the first electrical system branch)
ES1 First energy store, in particular lead battery, part of the first electrical system branch and connectable to this
ES2 Second energy store, in particular supercap (Nx), N=1 or N>1, in particular as series circuit (part of the second electrical system branch)
ES3 Third energy store, in particular supercap (Nx), N=1 or N>1, in particular as series circuit
SW1 Serial disconnection switch element (in particular MOSFET)
SW2 Supporting switch element (in particular MOSFET) (optional)
SW3 Decoupling switch element (MOSFET or relay)
CO1 Converter
CO2 Converter (lower power than CO1)
L2 Consumer in second electrical system branch
G2 Generator in third electrical system branch (optional)
L3 Consumer to be assigned to the third electrical system branch

What is claimed is:

1. A stabilization circuit for a vehicle electrical system, the stabilization circuit comprising:
    a first connection between the stabilization circuit and a first electrical system branch including a starter, a generator, a first energy store, and a first electrical consumer;
    a second connection between the stabilization circuit and a pole of the first energy store;
    a third connection between the stabilization circuit and a second electrical system branch including a second electrical consumer;
    a fourth connection between the stabilization circuit and a third electrical system branch including a third electrical consumer;
    a grounding connection for connection of the stabilization circuit to ground;
    a second energy store;
    a third energy store;
    a serial disconnection switch element between the second connection and the grounding connection; and
    a decoupling switch element connecting the first connection to the fourth connection;
    wherein the second energy store is connected between the grounding connection and the third connection; and
    wherein the third connection is connected via the third energy store and a first converter to the fourth connection.

2. The stabilization circuit according to claim 1, further comprising a supporting switch element connecting the second connection to the third connection.

3. The stabilization circuit according to claim 1, further comprising a second converter connecting the third connection to a pole of the third energy store, the pole pointing toward either the fourth connection or the first converter.

4. The stabilization circuit according to claim 1, wherein:
    the serial disconnection switch element comprises a diode with a direction of conduction pointing toward the first energy store; and
    the supporting switch element comprises a diode with a direction of conduction pointing toward either the second or the third energy store.

5. The stabilization circuit according to claim 1, wherein the third energy store comprises a single storage element.

6. The stabilization circuit according to claim 1, wherein:
    the second energy store comprises a single storage element or a series circuit of storage elements connected between the grounding connection and the third connection;
    the storage element of the second energy store comprises a capacitor, a supercapacitor, double-layer capacitor, electrolyte capacitor, a galvanic cell, a lithium-based galvanic cell or two or three individual storage elements connected parallel to one another.

7. The stabilization circuit according to claim 1, wherein the storage elements of the second or third energy store each comprise an individual capacitor or a parallel circuit of a plurality of capacitors.

8. The stabilization circuit according to claim 1, wherein the serial disconnection switch element and the decoupling switch element both comprise at least one switch chosen from the group consisting of: power semiconductor switches, MOSFETs, electromechanical switches, and relays.

9. The stabilization circuit according to claim 1, wherein the stabilization circuit is configured in at least one of the following states:
    a regeneration state in which the serial disconnection switch element is open and the decoupling switch element is closed to transmit regenerative power, present at the first connection or at the fourth connection, to the second and the third energy stores via the first converter;
    a first start state in which the decoupling switch element is open and the serial disconnection switch element is closed to transmit power from the first energy store to the first connection to supply the first electrical system branch without adversely affecting the other electrical system branches during a start process;
    a second start state in which the decoupling switch element is closed and the serial disconnection switch element is open or closed to transmit power from the second and/or third energy store to the first connection to support a start process.

10. The stabilization circuit according to claim 1, wherein the third energy store comprises a series circuit of storage elements.

11. The stabilization circuit according to claim 1, wherein the third energy store comprises a series circuit of capacitors, each chosen from the group consisting of: supercapacitors, double-layer capacitors, or electrolyte capacitors.

12. The stabilization circuit according to claim 1, wherein the third energy store comprises a series circuit of lithium-based galvanic cells.

13. The stabilization circuit according to claim 1, wherein the second or the third energy store comprises a plurality of series circuits of parallel-connected capacitors.

\* \* \* \* \*